(12) United States Patent
Ogasawara et al.

(10) Patent No.: US 9,672,961 B2
(45) Date of Patent: Jun. 6, 2017

(54) BUS BAR MODULE ACCOMMODATING PART STRUCTURE

(71) Applicants: YAZAKI CORPORATION, Minato-ku, Tokyo (JP); TOYOTA JIDOSHA KABUSHIKI KAISHA, Aichi-ken (JP)

(72) Inventors: Shigeyuki Ogasawara, Kakegawa (JP); Shinichi Yanagihara, Kakegawa (JP); Michio Ota, Kakegawa (JP); Akihiro Kosaki, Toyota (JP); Isao Nakagawa, Toyota (JP)

(73) Assignees: Yazaki Corporation, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 293 days.

(21) Appl. No.: 14/352,944

(22) PCT Filed: Aug. 29, 2013

(86) PCT No.: PCT/JP2013/073218
§ 371 (c)(1),
(2) Date: Apr. 18, 2014

(87) PCT Pub. No.: WO2014/034807
PCT Pub. Date: Mar. 6, 2014

(65) Prior Publication Data
US 2014/0238723 A1    Aug. 28, 2014

(30) Foreign Application Priority Data
Aug. 30, 2012  (JP) ................................ 2012-189948

(51) Int. Cl.
*H01B 7/00*    (2006.01)
*H01B 17/14*   (2006.01)
(Continued)

(52) U.S. Cl.
CPC ............. *H01B 17/14* (2013.01); *H01M 2/10* (2013.01); *H01M 2/206* (2013.01)

(58) Field of Classification Search
CPC ... H02B 1/21; H02B 1/00; H02B 1/20; H01R 4/70; H01R 4/22; H01B 17/00;
(Continued)

(56) References Cited

U.S. PATENT DOCUMENTS 4,234,760 A  * 11/1980 Lawson .................. H01R 4/70
                                                  174/138 F
4,415,044 A  * 11/1983 Davis ...................... H02G 3/088
                                                  174/138 F
(Continued)

FOREIGN PATENT DOCUMENTS

CN      101420106 A    4/2009
EP       1239506 A2    9/2002
(Continued)

OTHER PUBLICATIONS

Office Action dated Aug. 28, 2015, issued by the State Intellectual Property Office of P.R. China in counterpart Chinese Application No. 201380003766.9.
(Continued)

*Primary Examiner* — Pete Lee
(74) *Attorney, Agent, or Firm* — Sughrue Mion, PLLC (57) ABSTRACT

A synthetic resin plate (1) includes a plurality of accommodating parts (2) which accommodate at least one of bus bars, terminals, and electric wires which are connected to the terminals, hinges (7) which make first accommodating parts and second accommodating parts of the accommodating parts (2) connected and relatively movable, and projecting parts which are provided on the top surfaces of peripheral wall parts of the first accommodating parts, and which abut against parts of the second accommodating parts to restrict
(Continued)

the movable ranges in the movable directions of the second accommodating parts relative to the first accommodating pans.

2 Claims, 8 Drawing Sheets

(51) Int. Cl.
  *H01M 2/20* (2006.01)
  *H01M 2/10* (2006.01)
(58) Field of Classification Search
  CPC .... H01B 17/303; H01B 7/0045; H02G 15/18;
    H02G 3/00; H02G 3/0431; H02G 3/26;
    B60R 16/0207; H01M 10/0445; H01M
    10/0477; H01M 10/0585; H01M 4/02;
    H01M 4/043; H01M 4/06; H01M 4/13
  USPC ................. 429/128, 158, 65, 175; 361/611;
    174/70 C, 138 F, 72 A, 74 A, 135;
    439/447, 521
  See application file for complete search history.

(56) References Cited

U.S. PATENT DOCUMENTS

| | | | | |
|---|---|---|---|---|
| 4,562,125 A * | 12/1985 | Davis | ................. | H01M 2/1083 180/68.5 |
| 5,576,516 A * | 11/1996 | Kameyama | ............. | H01M 2/32 174/138 F |
| 5,977,485 A * | 11/1999 | Yoshimura | ............ | H01M 2/206 174/135 |
| 6,444,903 B2 * | 9/2002 | Saeki | ................. | H02G 3/0608 174/135 |
| 2002/0134572 A1 | 9/2002 | Matsumura | | |
| 2002/0168566 A1 * | 11/2002 | Ohtsuka | ............... | H01M 2/043 429/175 |
| 2004/0008503 A1 * | 1/2004 | Higuchi | ............... | H01H 85/044 361/833 |
| 2011/0064987 A1 | 3/2011 | Ogasawara et al. | | |
| 2011/0315431 A1 * | 12/2011 | Mase | ....................... | H01R 4/34 174/138 F |
| 2012/0164509 A1 | 6/2012 | Ogasawara et al. | | |
| 2012/0183833 A1 | 7/2012 | Ikeda et al. | | |
| 2013/0034765 A1 * | 2/2013 | Kowalski | .............. | H01M 2/305 429/100 |
| 2013/0171495 A1 | 7/2013 | Ogasawara et al. | | |
| 2013/0178091 A1 | 7/2013 | Ogasawara et al. | | |
| 2013/0344377 A1 | 12/2013 | Ogasawara et al. | | |

FOREIGN PATENT DOCUMENTS

| | | |
|---|---|---|
| EP | 2056658 A2 | 5/2009 |
| JP | 5-303878 A | 11/1993 |
| JP | 7-327313 A | 12/1995 |
| JP | 2003-142058 A | 5/2003 |
| JP | 2010-170884 A | 8/2010 |
| JP | 2011-77031 A | 4/2011 |
| WO | 2011/142213 A1 | 11/2011 |
| WO | 2012/108514 A1 | 8/2012 |

OTHER PUBLICATIONS

International Search Report dated Oct. 8, 2013 issued in International Application No. PCT/JP2013/073218 (PCT/ISA/210).
Written Opinion dated Oct. 8, 2013 issued in International Application No. PCT/JP2013/073218 (PCT/ISA/237).
Search Report dated Mar. 3, 2015, issued by the International Searching Authority in counterpart International Application No. PCT/JP2013/073218.
Communication dated Feb. 1, 2016, from the State Intellectual Property Office of People's Republic of China in counterpart Application No. 201380003766.9.
Communication issued Mar. 7, 2016, issued by the European Patent Office in counterpart European Patent Application No. 13832131.0.
Office Action issued on Jul. 5, 2016, by the Japanese Patent Office in counterpart Japanese Application No. 2012-189948.

* cited by examiner

BUS BAR MODULE ACCOMMODATING PART STRUCTURE

TECHNICAL FIELD

The present invention relates to a bus bar module accommodating part structure.

BACKGROUND ART

In a traditional bus bar module accommodating pan structure, hinges to connect accommodating parts are used to hold a plurality of accommodating parts.

A bus bar module disclosed in a PTL1 includes a plurality of bus bars, which connect a plurality of battery cells in series by connecting electrodes of the battery cells which are adjacent to one another of a battery cell assembly which is formed by alternately in opposite directions combining the plurality of battery cells each having a positive electrode at one end and a negative electrode at the other end, a plurality of terminals which detect the voltage of the battery cells connected by the bus bars, a plurality of electric wires which are connected to the terminals, and a synthetic resin plate which accommodates the bus bars, the terminals and the electric wires. Furthermore, the plate includes a plurality of first accommodating parts which accommodate the bus bars and the terminals connected to the bus bars and which are arranged in a direction the battery cells are combined, a plurality of second accommodating parts of gutter-shaped wire accommodating parts which are capable of accommodating the electric wires which are connected to the terminals when the plurality of wire accommodating parts are linearly arranged in a direction parallel to the arranging direction of the first accommodating parts, a plurality of third accommodating parts which connect the first accommodating parts and the second accommodating parts, which face each other, and accommodate the connecting parts of the electric wires and the terminals, a plurality of first pitch adjusting means which adjust the positional deviations of the bus bars and the electrodes by changing gaps between the first accommodating parts adjacent to each other, a plurality of second pitch adjusting means which change gaps between the second accommodating parts adjacent to each other, and a plurality of fixed part pairs which are placed at the wire accommodating parts with intervals along the arrangement direction of the first accommodating parts and are paired at a position where the second pitch adjusting means are positioned with intervals, and which fix the electric wires. Each of the electric wires is formed to have a length from one end of the plate whose bus bar is positioned to be connectable to each electrode of the battery cell assembly which is formed to have maximum dimension within a range of tolerance, to the third accommodating part which accommodates the connecting parts of the electric wires.

Thus, the bus bar module of the above construction, which is suitable to be attached to the battery cell assembly (battery cell stack) for which the accumulated tolerance is large, can be provided.

CITATION LIST

Patent Literature

PTL1: JP-A-2010-170884

SUMMARY OF THE INVENTION

Problems to be Solved by the Invention

The traditional bus bar module accommodating part structure is suitable to be attached to the battery cell assembly (battery cell stack) for which the accumulated tolerance is large, but if the accommodating parts excessively deform with hinges, it is hard for the bus bar module to be assembled with the battery.

Figure 5:
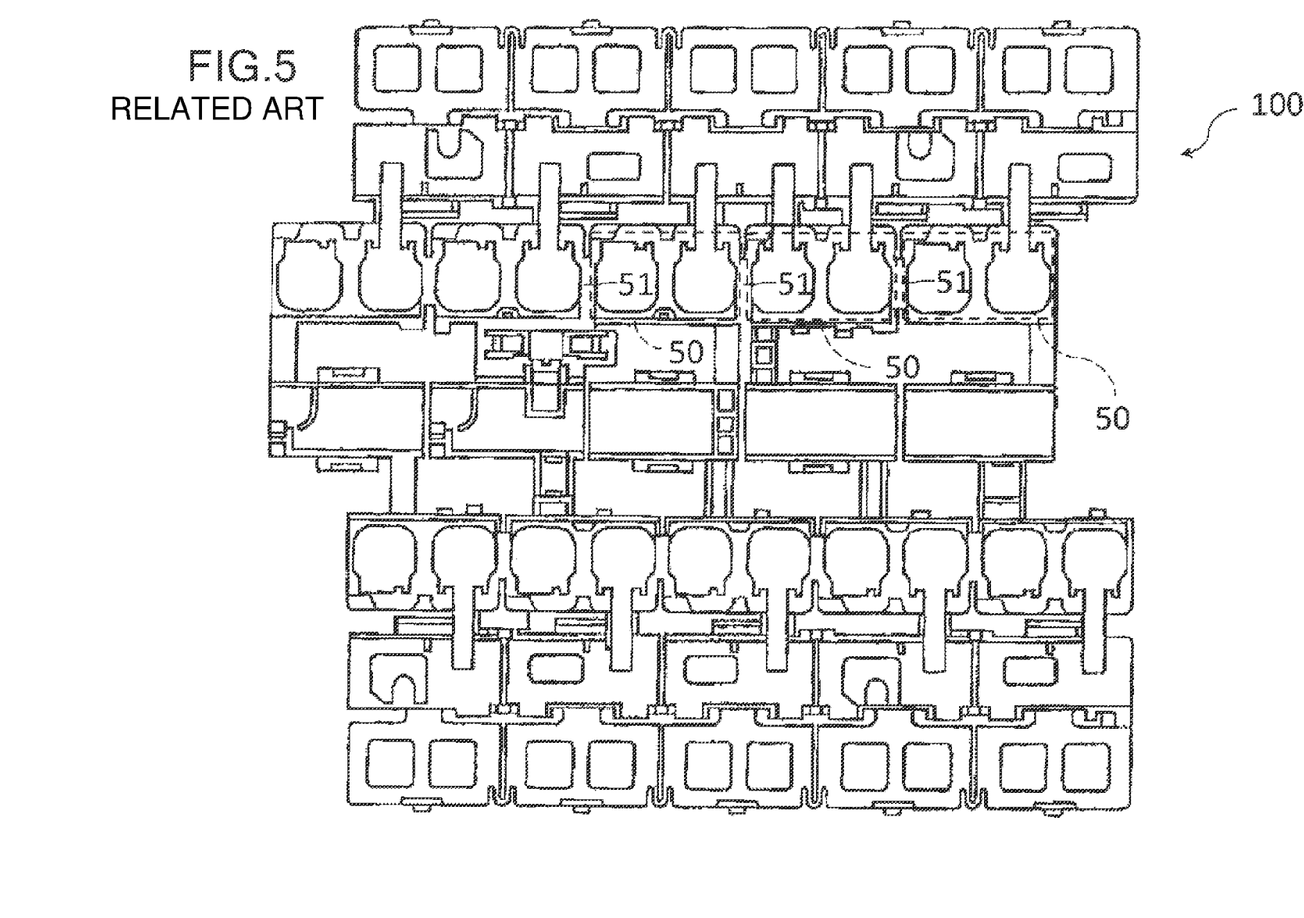
FIG. 5 is a top view which shows a synthetic resin plate which has a traditional bus bar module accommodating part structure.
Figure 6:
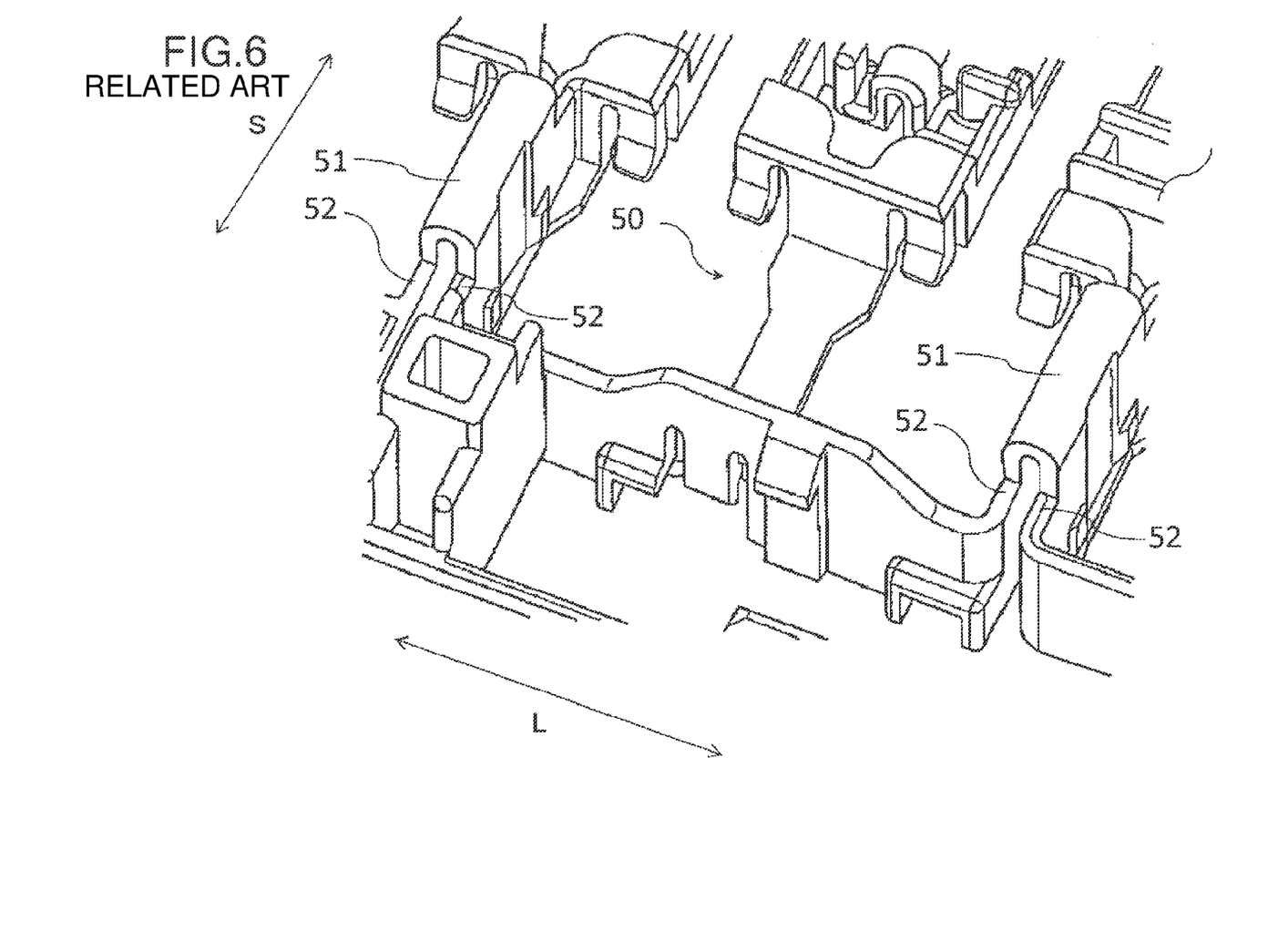
FIG. 6 is an enlarged perspective view of an accommodating part including hinges shown in FIG. 5.

For example, FIG. 5 is a top view which shows a synthetic resin plate which has the traditional bus bar module accommodating part structure. As shown in FIG. 5, a synthetic resin plate 100, which has the bus bar module accommodating part structure, includes a plurality of accommodating parts 50, and the accommodating parts 50 are connected by hinges 51. FIG. 6 is an enlarged view of the accommodating part 50 including the hinges 51. As shown in FIG. 6, a plurality of accommodating parts 50 are connected through hinges in the longitudinal direction of the accommodating parts 50 (arrow L direction in FIG. 6). The hinges 51 connect wall top surfaces 52 which extend in the lateral direction (arrow S direction in FIG. 6) of the accommodating parts 50, and the section of the hinges 51 is formed into a U-shape.

Figure 7A:
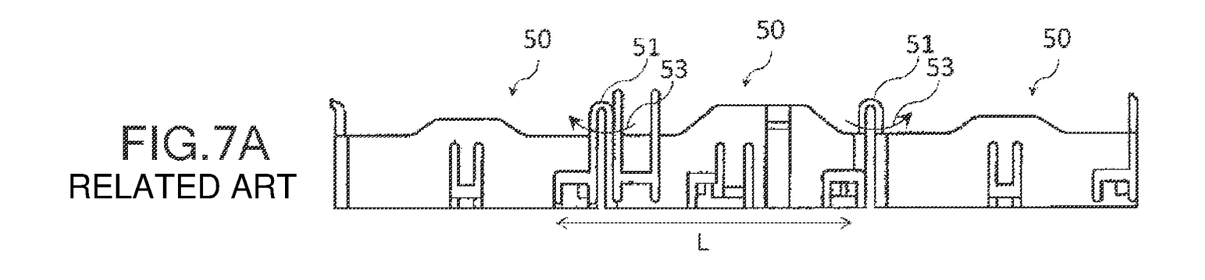
FIGS. 7A and 7B are partial front views which show that the accommodating parts shown in FIG. 5 are connected in the longitudinal direction of the accommodating parts.
Figure 7B:
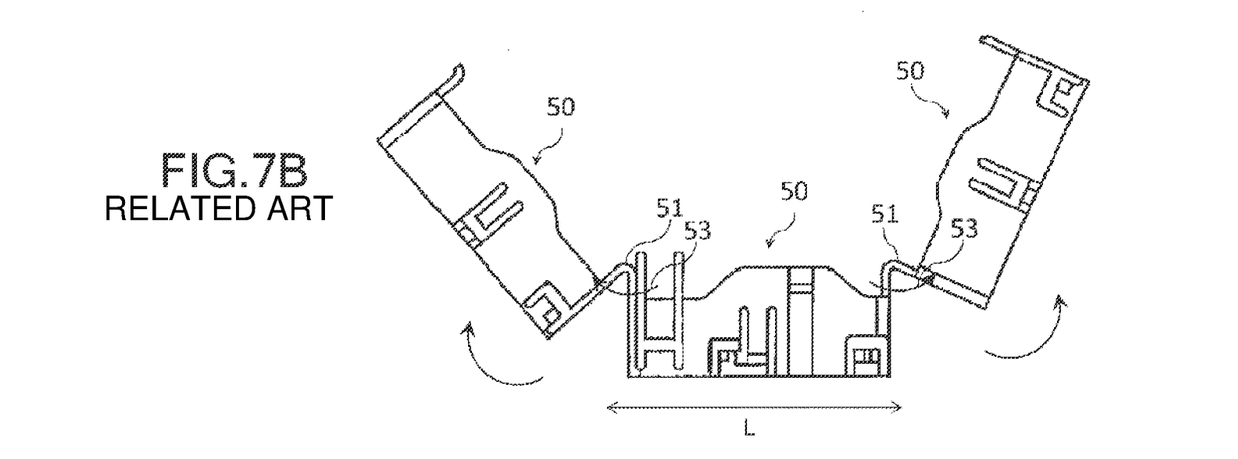

FIGS. 7A and 7B are figures which show that three accommodating parts 50 of the above plate 100 are connected in the longitudinal direction (arrow L direction in Fig) of the accommodating parts 50. As shown in FIG. 7A, the connected accommodating parts 50 are movable in moving directions 53 of the hinges 51. That is, the connected accommodating parts 50 are rotatable in a rotating direction with the hinge 51 as a center and with the longitudinal direction (arrow L direction in Fig) of the accommodating part 50 as a radial direction. However, as shown in FIG. 7B, because the movable range of the accommodating part 50 in the rotating direction is not restricted, the accommodating part 50 may excessively deform with the hinge 51.

In this way, when the accommodating part 50, which is movable, deforms excessively, the plate 100 itself, which includes the bus bar module accommodating part structure, deforms, and it is hard for the bus bar module to be assembled to the battery.

Figure 8:
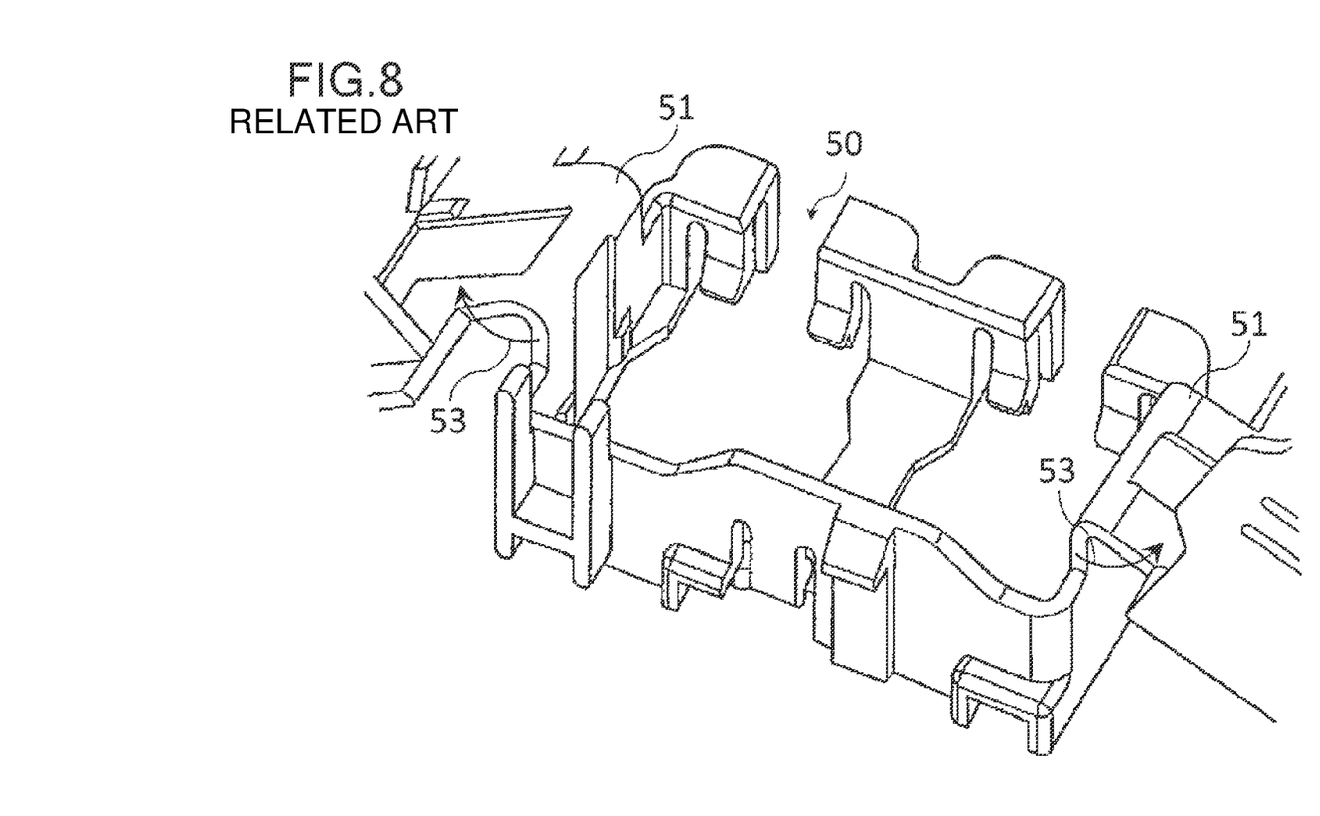
FIG. 8 is a perspective view which shows that the accommodating parts shown in FIG. 6 deform excessively.

FIG. 8 is a figure which shows that the accommodating parts 50 deform excessively. As shown in FIG. 8, when the accommodating part 50 rotates around the hinge 51, the accommodating part 50 may excessively deform. In this case, because the plate 100 including the bus bar module accommodating part structure is constructed of a plurality of accommodating parts 50, even if the deformation of each accommodating part 50 can be ignored, the deformation of the entire bus bar module plate 100 cannot be ignored. As a result, the plurality of accommodating parts 50 of the bus bar module plate 100 are not aligned in a horizontal surface in the longitudinal direction of the accommodating part 50, and it may be difficult for the bus bar module plate 100 to be assembled with the battery.

The present invention is made in view of the above traditional situations, and the object of the present invention is to provide a bus bar module accommodating part structure for which the mutual movable range of a plurality of the accommodating parts can be restricted.

Solution to Problem

The above object of the present invention is accomplished by the following constructions.

(1) According to an aspect of the invention a bus bar module accommodating part structure includes a first accommodating part and a second accommodating part that accommodate at least one of a bus bar, a terminal, and an electric wire which is connected to the terminal, respectively, a hinge that connects the first accommodating part with the second accommodating part, and makes the connected second accommodating part movable relative to the first accommodating part, and a projecting part that is provided on a top surface of a peripheral wall part of the first accommodating part, and restricts a movable range of the second accommodating pan in a movable direction of the second accommodating part relative to the first accommodating part by abutting against a part of the second accommodating part.

According to the bus bar module accommodating part structure described in the above (1), when the movable range of the second accommodating part relative to the first accommodating parts is restricted, the first and second accommodating parts are prevented from excessively deforming with the hinge. Thus, it can be easy to mount the bus bar module to a battery cell assembly (battery cell stack).

(2) In the bus bar module accommodating part structure of (1), the projecting part is provided at an end part on the top surface of a wall part extending in a longitudinal direction of the first accommodating part, of the peripheral wall part.

According to the bus bar module accommodating part structure described in the above (2), because the projecting part is provided at an end part on the top surface of the wall (side wall) extending in the longitudinal direction to restrict the mutual movable range of the first and second accommodating parts, the projecting part and wall (side wall) can be prevented from excessively deforming.

(3) In the bus bar module accommodating part structure of (2), the second accommodating part includes an abutting part which abuts against the projecting part.

According to the bus bar module accommodating part structure described in the above (3), when the projecting part which restricts the mutual movable range abuts against the abutting part of the second accommodating part, the movable range of the first and second accommodating parts is surely restricted, and these accommodating parts can be prevented from excessively deforming with the hinge.

(4) In the bus bar module accommodating part structure of (3), an electric wire wiring part of the second accommodating part, which accommodates the electric wires along a lateral direction of the second accommodating part, is disposed at a position adjacent to the hinge, and a wall or a wire locking projecting part of the electric wire wiring part becomes the abutting part.

According to the bus bar module accommodating part structure described in the above (4), because the electric wire wiring part is provided between the first accommodating part and the second accommodating part, electric wires can be wired between the first accommodating part and the second accommodating part. In addition, when the electric wire wiring part becomes the abutting part, the movable range of the first and second accommodating parts is restricted, and the first and second accommodating parts can be prevented from excessively deforming with the hinge.

DESCRIPTION OF EMBODIMENTS

Next, a bus bar module accommodating part structure according to an embodiment of the present invention will be described by using the figures.

Figure 1:
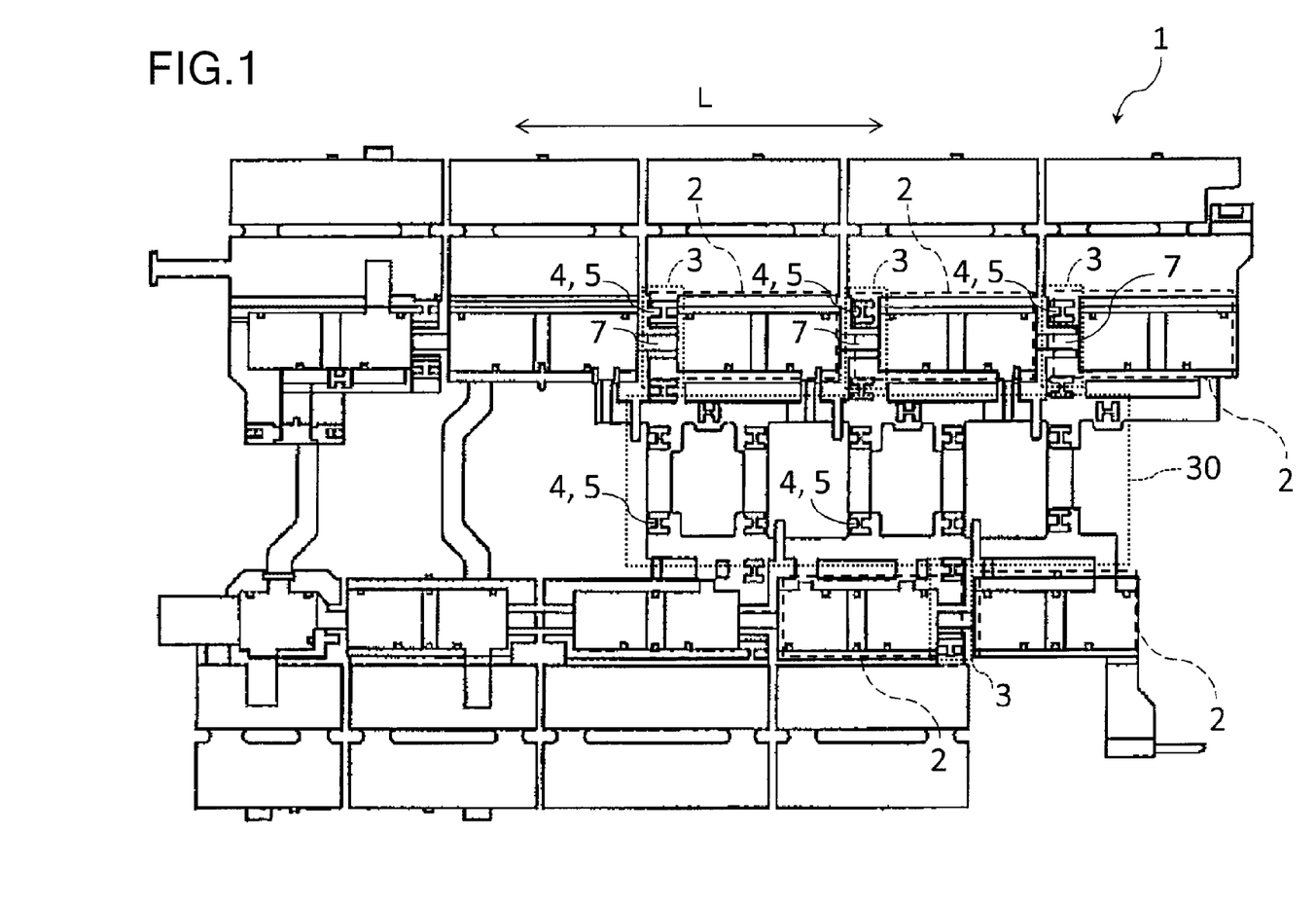
FIG. 1 is a top view which shows an example of a plate which is made of synthetic resin and has a bus bar module accommodating part structure according to an embodiment of the present invention.

FIG. 1 is a top view which shows an example of a synthetic resin plate which has the bus bar module accommodating part structure according to the embodiment of the present invention.

A bus bar module, which includes a synthetic resin plate 1, is assembled to a battery (battery cell assembly), which is not shown, to form a power supply device. The battery (battery cell assembly) is formed by combining a plurality of battery cells, each of which has an anode and a cathode. When the plurality of battery cells are combined, the plurality of batteries are combined alternately in opposite directions so that the anode of a battery and the cathode of the adjacent battery are adjacent.

This power supply device supplies power to the component elements of an automobile. In addition, this power supply device is loaded in an electric automobile or a hybrid automobile, and supplies power to an electric motor or is charged from an electric motor.

The plate 1 having the bus bar module accommodating part structure according to the embodiment is formed of electrically insulating synthetic resin and includes a plurality of accommodating parts 2. The plurality of accommodating parts 2 are arranged in the longitudinal direction of the rectangular accommodating parts 2. The plurality of accommodating parts 2 arranged in the longitudinal direction are arranged in two rows which are spaced from each other. The accommodating parts 2 accommodate at least one of bus bars, terminals, and electric wires which are connected to the terminal. These adjacent battery cells are electrically connected in series by the bus bars (not shown). The terminal (not shown) is connected to each bus bar in order to detect the voltage of the battery cell. One end of the electric wire (not shown) is connected to a terminal, and the other end is connected to a connector. The electric wire is wired into the plate 1 of the bus bar module, and is connected to a voltage detecting circuit when the connector is connected with an external connector.

In addition, the electric wires are wired into the plate 1 by being accommodated in electric wire wiring parts 3 and 30. The electric wire wiring parts 3 and 30 include walls 4 which face each other to accommodate these electric wires into accommodating positions and wire locking projecting parts 5 which face each other to lock the electric wires. When the electric wires are accommodated between the facing walls 4 and locked by the wire locking projecting part 5, the electric wires are wired into the electric wire wiring parts 3 and 30 of the plate 1 of the bus bar module.

The electric wire wiring part 3 is formed as one part of the accommodating part 2. In addition, the electric wire wiring part 30 is formed between the accommodating parts 2 which are arranged in two rows. The electric wire wiring part 30 is separated into divisions to have flexibility, but each of the separated divisions are connected by elastic members.

The adjacent accommodating parts 2 are connected by hinges 7. Because the hinge 7 has elasticity, the hinge 7 can adjust the distance between the adjacent accommodating parts 2 when the hinge 7 contracts, expands or flexes. Therefore, the plate 1 of the bus bar module can be easily mounted to the battery cell assembly (battery cell stack) for which the accumulated tolerance is large.

Figure 2:
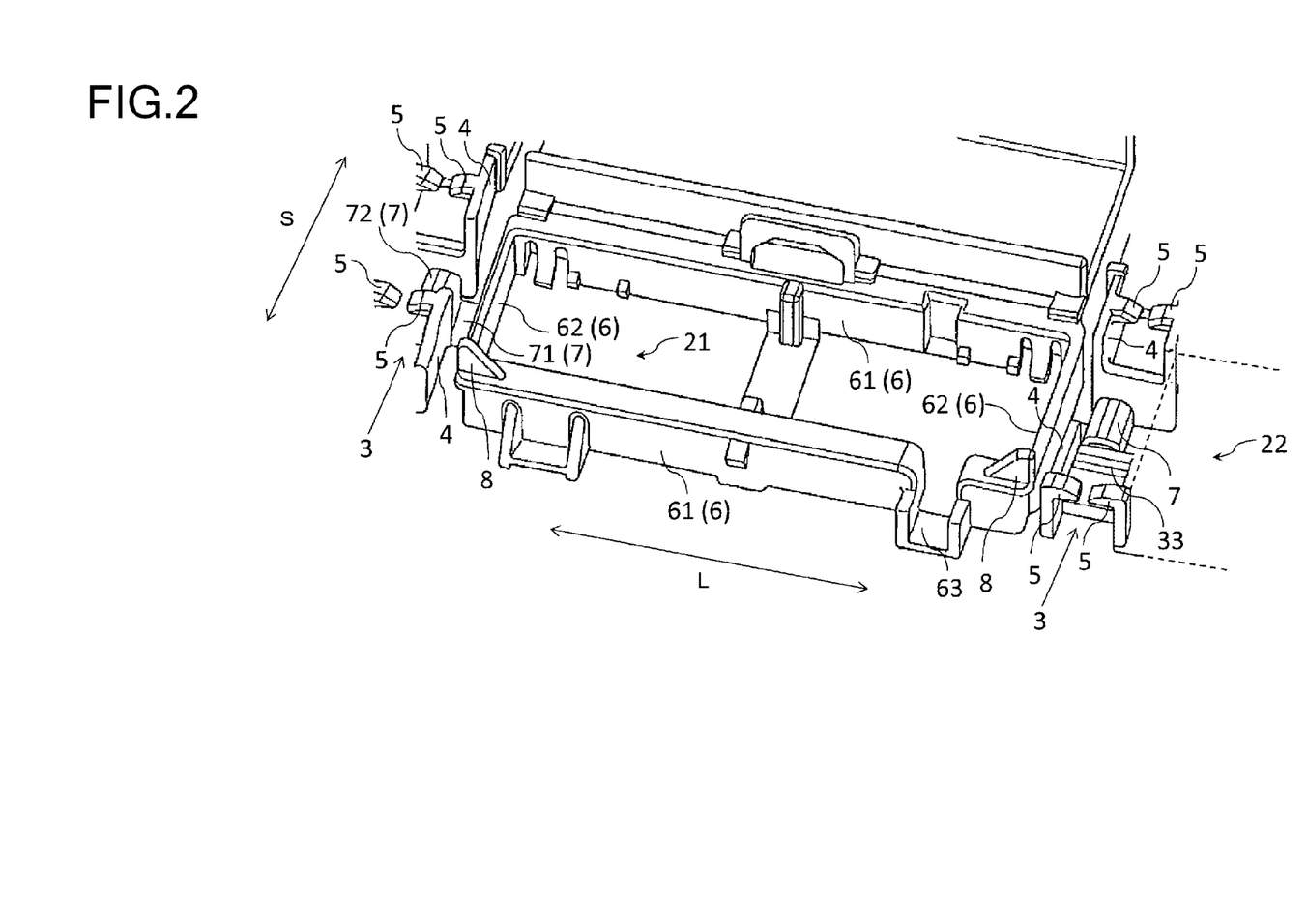
FIG. 2 is an enlarged perspective view of the accommodating part shown in FIG. 1 and the area around the accommodating part.

FIG. 2 is an enlarged perspective view of the accommodating part 2 shown in FIG. 1 and the area around the accommodating part. As shown in FIG. 2, a first accommodating part 21 and a second accommodating part 22 in the accommodating part 2 are arranged in the longitudinal direction of the first and second accommodating parts 21 and 22, and the first accommodating part 21 and the second accommodating part 22 include a peripheral wall part 6 which accommodates at least one of bus bars, terminals and electric wires which are connected to the terminals. The peripheral wall part 6 is constructed of walls 61 in the longitudinal direction of the first and second accommodating parts 21 and 22 and walls 62 in the lateral direction. An accommodating concave part 63, which the wall 61 in the longitudinal direction is provided with, accommodates a terminal or an electric wire which is connected to the terminal.

The hinge 7 connects the first accommodating part 21 with the second accommodating part 22, and the connected second accommodating part 22 is movable relative to the first accommodating part 21. The hinge 7 includes a flat member 71 extending in the longitudinal direction and a U-shaped member 72, and is connected with the wall 62 in the lateral direction. In the present embodiment, the hinge 7 is connected to the lower part of the wall 62 in the lateral direction. The section in the longitudinal direction of the U-shaped member 72 is U-shaped, and the first accommodating part 21 and the second accommodating part 22 are mutually movable when the U-shaped member 72 is bent.

The first accommodating part 21 includes projecting parts 8. When the projecting parts 8, which the top surface of the peripheral wall part 6 of the first accommodating pan 21 is provided with, abut against a part of the second accommodating part 22, the movable range in the movable direction of the second accommodating part 22 relative to the first accommodating part 21 is restricted. In the present embodiment, the projecting parts 8 are provided at end parts on the top surface of the wall 61 in the longitudinal direction of the peripheral wall part 6 of the first accommodating part 21. In the present embodiment, two opposite projecting parts 8 are formed at the end parts on the top surface of one wall 61 which is positioned at an inner side of the first accommodating part 21 in these two walls 61 in the longitudinal direction, and are formed integrally with the wall 61. The two projecting parts 8 are formed into right-angled triangle shapes, and are opposed to each other so that two right angle parts are positioned at outer sides. Because the projecting pans 8, which restrict the mutual movable range of the first accommodating part 21 and the second accommodating part 22, are provided at the end parts on the top surface of the wall (side wall) 61 which extends in the longitudinal direction, these projecting parts 8 and the wall (side wall) 61 can be prevented from excessively deforming. In addition, the projecting parts 8 may be ribs.

In addition, the second accommodating part 22 includes abutting parts which abut against the projecting parts 8. In the present embodiment, the abutting parts are the walls 4 or the wire locking projecting parts 5 of the electric wire wiring part 3 of the second accommodating part 22. The second accommodating part 22 includes the electric wire wiring part 3. The electric wire wiring part 3 is positioned to be adjacent to the hinge 7 and accommodates the electric wires along the lateral direction of the second accommodating part 22.

When the projecting parts 8 which restrict the mutual movable range abut against the abutting parts (the walls 4 or the wire locking projecting parts 5) of the second accommodating part 22, the movable range of the first and second accommodating parts 21 and 22 is surely restricted, and the second accommodating part 22 and the hinge 7 can be prevented from excessively deforming. In this case, the shapes or positions of the projecting parts 8 and the abutting parts may be adjusted in accordance with the restricted movable range. In addition, the number of the projecting parts 8 and the abutting parts can be arbitrarily set.

The electric wire wiring part 3 of the second accommodating part 22 shown in FIG. 2 is formed from the wall 62 in the lateral direction of the second accommodating part 22 to the side of the first accommodating part 21. The walls 4 and the wire locking projecting parts 5 of the electric wire wiring part 3 are formed at two places at two end parts of the wall 62 in the lateral direction, and the hinge 7 is positioned between these two places. In the present embodiment, a height difference between a lower part 33 of the electric wire wiring part 3 and the upper part of the hinge 7 is formed in such a degree that the hinge 7 will not disturb the layout of the electric wires in the electric wire wiring part 3.

Figure 3A:
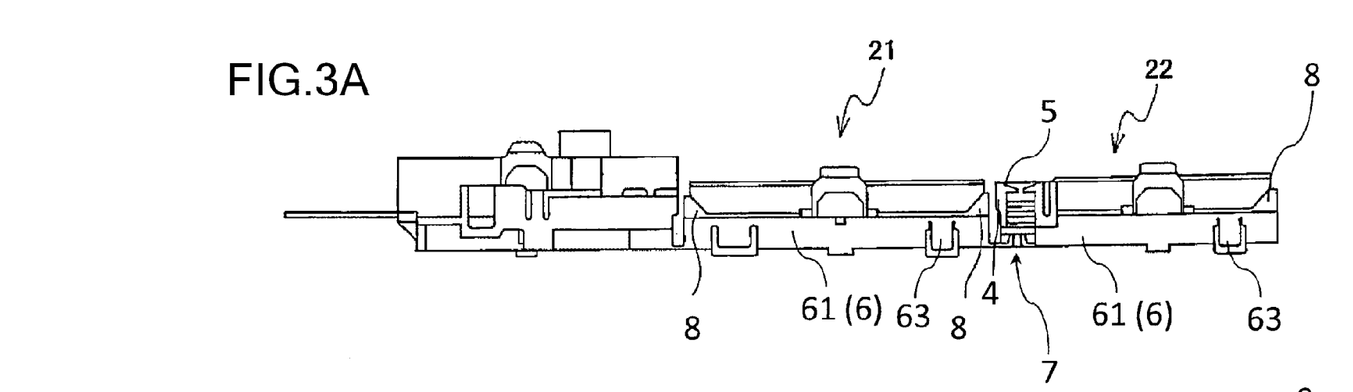
FIGS. 3A and 3B are partial front views which show that a first accommodating part and a second accommodating part of the accommodating part shown in FIG. 1 are mutually movable.
Figure 3B:
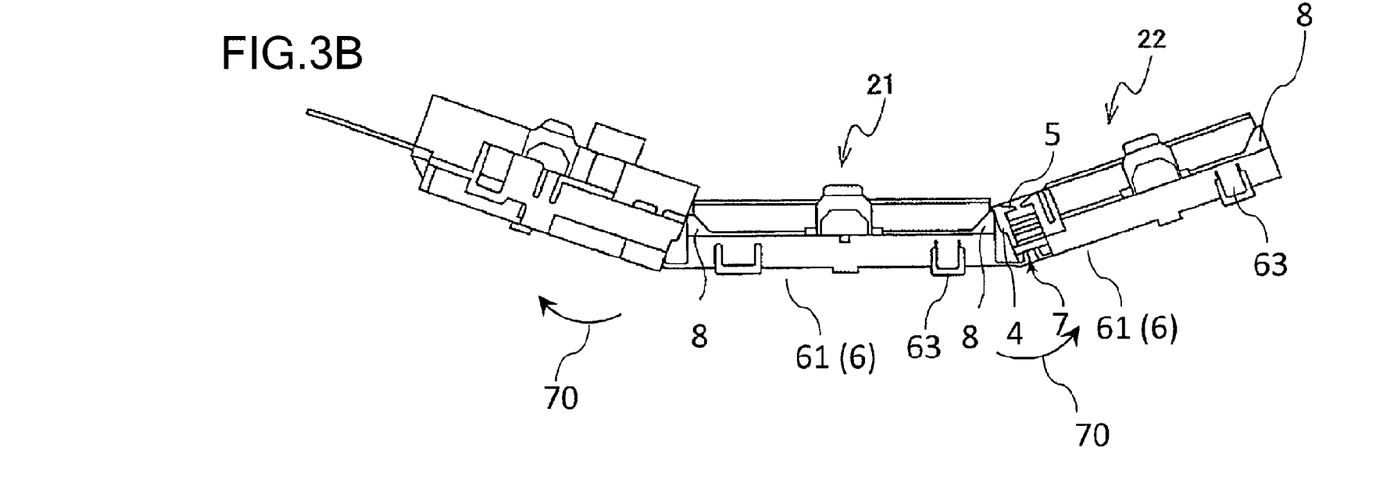

Next, it will be described that the movable range of the accommodating part 2 of the present embodiment is restricted. FIGS. 3A and 3B are partial front views which show that the first accommodating part 21 and the second accommodating part 22 of the accommodating part 2 shown in FIG. 1 are mutually movable.

As shown in FIG. 3A, the first accommodating part 21 and the second accommodating part 22 can rotate in a rotating direction (movable direction) 70 with the hinge 7 as a center and with the longitudinal direction of the first and second accommodating parts 21 and 22 as the radial direction. As shown in FIG. 3B, when the projecting part 8 abuts against a part of the second accommodating part 22, the movable range in the movable direction 70 of the second accommodating part 22 relative to the first accommodating part 21 can be restricted. That is, compared with the movable range of the accommodating part 50 shown in FIG. 7B, the movable range of the second accommodating part 22 is restricted since the projecting part 8 abuts against a part of the second accommodating part 22.

Figure 4:
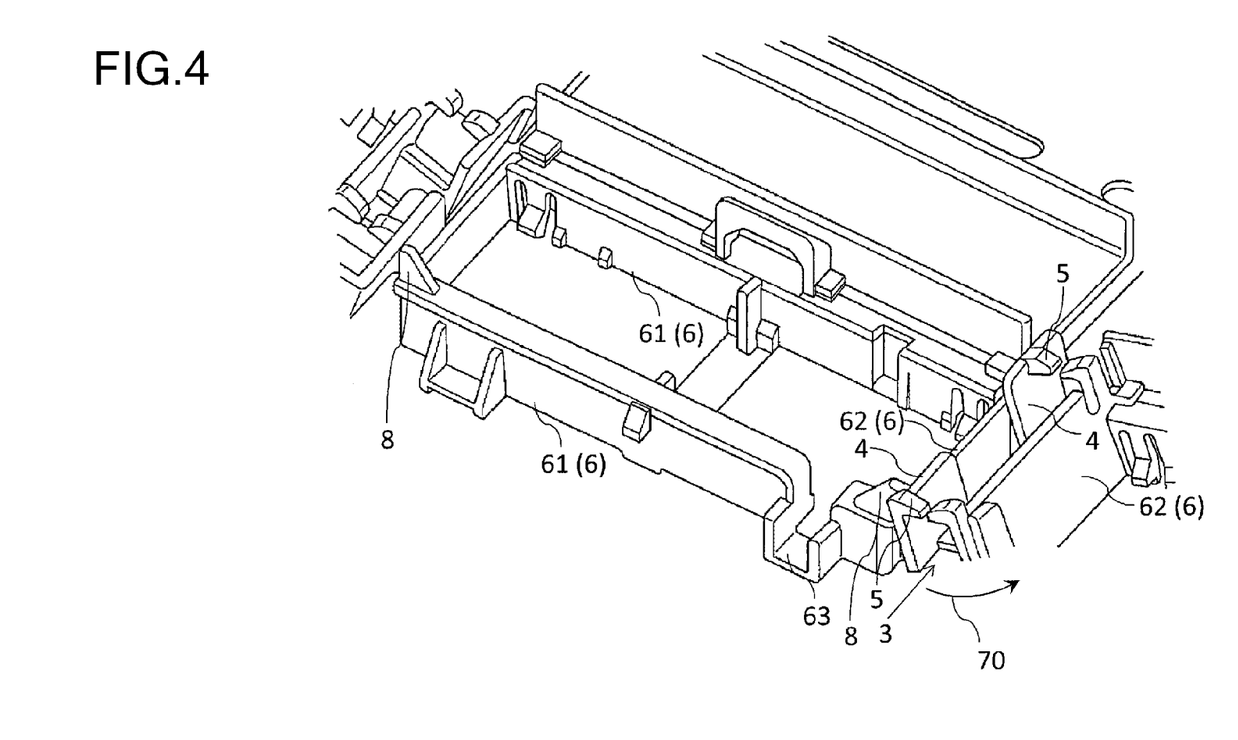
FIG. 4 is a perspective view which shows that a projecting part shown in FIG. 2 restricts the movable range of the second accommodating part in a movable direction relative to the first accommodating part.

FIG. 4 is a perspective view which shows that the projecting part 8 restricts the movable range of the second accommodating part 22 in the movable direction 70 relative to the first accommodating part 21.

As shown in FIG. 4, since the projecting part 8 abuts against the wall 4 of the electric wire wiring part 3 of the second accommodating part 22, the movable range in the movable direction 70 of the second accommodating part 22 relative to the first accommodating part 21 can be restricted so that the second accommodating part 22 will not excessively rotate to deform in the rotating direction (movable direction) 70 with the hinge 7 as a center.

Here, features of the bus bar module accommodating part structure according to the above embodiment of the present invention will be briefly collected and listed below respectively.

[1] A bus bar module accommodating part structure including a first accommodating part 21 and a second accommodating part 22 which accommodate at least one of bus bars, terminals, and electric wires connected to the terminals, respectively, a hinge 7 which connects the first accommodating part 21 with the second accommodating part 22, and makes the connected second accommodating part 22 movable relative to the first accommodating part 21, and a projecting part 8 which is provided on a top surface of a peripheral wall part 6 of the first accommodating part 21, and which restricts a movable range of the second accommodating part 22 in a movable direction 70 of the second accommodating part 22 relative to the first accommodating part 21 by abutting against a part of the second accommodating part 22.

[2] The bus bar module accommodating part structure in the above [1], in which the projecting part 8 is provided at an end part on the top surface of a wall part 61 extending in a longitudinal direction of the first accommodating part 21, of the peripheral wall part 6.

[3] The bus bar module accommodating part structure in the above [2], in which the second accommodating part 22 includes an abutting part which abuts against the projecting part 8.

[4] The bus bar module accommodating part structure in the above [3], in which an electric wire wiring part 3 of the second accommodating part 22, which accommodates the electric wires along the lateral direction of the second accommodating part 22, is positioned to be adjacent to the hinge 7, and a wall 4 or a wire locking projecting part 5 of the electric wire wiring part 3 becomes the abutting part.

The embodiments of the present invention were described, but the present invention is not limited to the above, and may be changed or modified in the range recorded in claims.

This application is based on the Japanese patent application No. 2012-189948, filed on Aug. 30, 2012, whose content is incorporated herein by reference.

INDUSTRIAL APPLICABILITY

The bus bar module accommodating part structure of the present invention is useful as a bus bar module accommodating part structure or the like, for which the accommodating parts are prevented from excessively deforming with hinges since the mutual movable ranges of the plurality of accommodating parts are restricted, an effect is achieved which is that the bus bar module can be easy to be mounted to a battery cell assembly (battery cell stack), and the mutual movable ranges of the plurality of accommodating parts are restricted.

REFERENCE NUMERALS LIST 1 plate
2 accommodating part
3, 30 electric wire wiring part
4 wall
5 electric wire locking projecting part
6 peripheral wall part
61, 62 wall
7 hinge
8 projecting part
21 first accommodating part
22 second accommodating part
63 accommodating concave part
70 movable direction

The invention claimed is:

1. An accommodating structure comprising: a first accommodating part and a second accommodating part configured to accommodate at least one of a bus bar, a terminal, and an electric wire, wherein the first accommodating part further comprises a peripheral wall part having a first end and a second end opposite to the first end; a hinge connecting the first accommodating part with the second accommodating part, wherein the hinge is configured to make the connected second accommodating part movable relative to the first accommodating part, the hinge being provided on the first end of the peripheral wall part of the first accommodating part; and a projecting part configured to restrict a movable range of the second accommodating part in a movable direction of the second accommodating part relative to the first accommodating part by abutting against the second accommodating part, the projecting part being provided on the second end of the peripheral wall part of the first accommodating part.

2. The bus bar module accommodating part structure according to claim 1 further comprising:
an electric wire wiring part configured to accommodate electric wires,
wherein the electric wire wiring part further comprises a wire locking projecting part configured to lock the electric wires,
wherein the electric wire wiring part is disposed at a position adjacent to the hinge, between the first accommodating part and the second accommodating part, and
wherein the projecting part of the first accommodating part abuts against the wire locking projecting part to restrict the movable range of the second accommodating part.

* * * * *